United States Patent Office 3,846,117
Patented Nov. 5, 1974

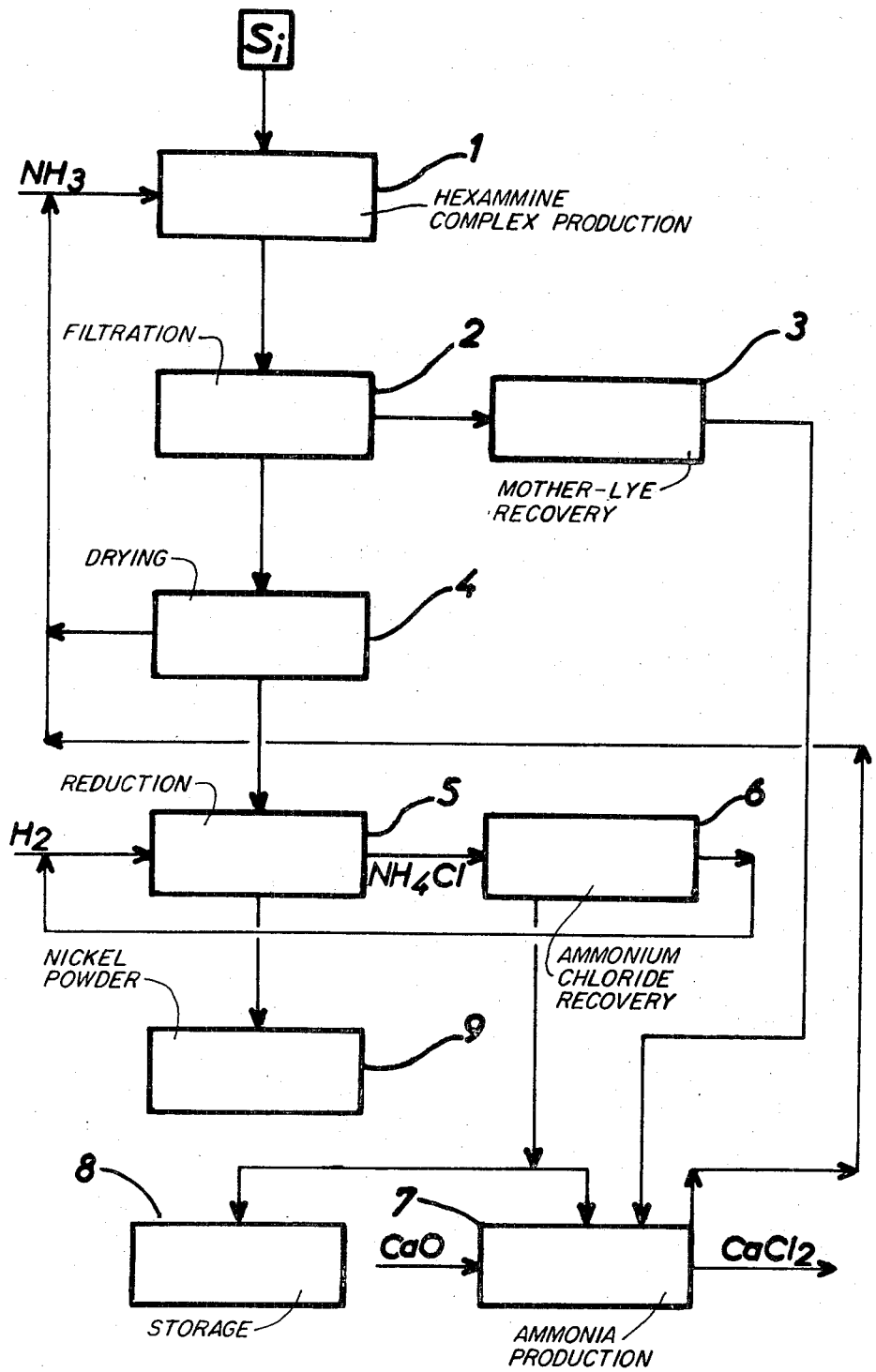

3,846,117
METHOD FOR PRODUCING HIGH-PURITY NICKEL POWDER WITH PREDETERMINED PHYSICAL CHARACTERISTICS
Louis Gandon and Serge Solar, Le Havre, France, assignors to Le Nickel, Paris, France
Filed Sept. 13, 1972, Ser. No. 288,882
Int. Cl. C22b 23/04
U.S. Cl. 75—.5 AA                    11 Claims

ABSTRACT OF THE DISCLOSURE

A method for producing high-purity nickel powder with predetermined physical properties in which gaseous ammonia or an aqueous solution of ammonia is reacted at a temperature between 20 and 40° C. with nickel chloride in an aqueous solution containing at least 50 g./l. of nickel, the resulting precipitate of hexammine complex of nickel chloride is separated by filtration, dried at a temperature higher than 100° C. in order to at least partially convert it into a diammine complex of nickel chloride and to release ammonia, and said diammine complex is reduced with hydrogen at a temperature between 450 and 1,000° C.

---

The present invention relates to an improved method for producing high-purity nickel powders which are free of, among others, chlorine, sulphus, alkali metals, and alkaline-earth metals. Furthermore, the method according to the invention leads to the production of powders which have controlled physical characteristics, in particular with regard to their grain size grading.

The nickel powders obtained by the method according to the invention are suitable for various uses and meet more specifically the requirements of certain new applications of powder metallurgy.

More particularly, the method according to the invention relates to the production of nickel by the so-called "hexammine way," i.e., a hexammine complex of nickel chloride is first prepared then reduced by hydrogen.

Known methods for the production of a hexammine complex of nickel chloride consist in the treatment of anhydrous nickel chloride by gaseous ammonia or in the treatment of a solution of nickel chloride by aqueous ammonia, the resulting product being subsequently precipitated by alcohol. According to other known methods, liquid ammonia is contacted with a mixture of nickel oxide and ammonium chloride, or aqueous ammonia is reacted with a suspension of nickel carbonate in the presence of sodium chloride.

The first of these methods presents the major drawback that anhydrous products are required and that such products are very expensive, whereas the second method, which is carried out in an aqueous solution, is inconvenient since alcohol is used to render the obtained product insoluble.

The production by means of liquid ammonia involves very complicated and costly equipment, and the production from nickel carbonate involves a supplementary preparation step when a soluble nickel salt is used as the initial product.

The other most current methods of obtaining nickel powder can be summarized as follows:

reduction of a nickel salt dissolved in an ammoniacal solution, by means of hydrogen under pressure in an autoclave;
decomposition of nickel carbonyl,
pyrolysis of organic or inorganic nickel salts in the presence or not of a reducing agent; and
precipitation of nickel from an aqueous solution of a nickel salt by means of a metal which is more electronegative than nickel.

The method of reduction under pressure requires equipment which is very expensive and difficult to operate. Furthermore, this leads to impure nickel powders, generally contaminated by alkali metals, by alkaline-earth metals and, principally, by halogens and sulphur which can never be completely eliminated by hydrometallurgical processes.

The gaseous-phase method, via nickel carbonyl, is subject to the drawback that it produces powders which contain substantial amounts of carbon.

The pyrolysis of nickel oxalate or nickel formate is a costly method, since the organic acid is destroyed during the treatment. Furthermore, this method is too dependent on the purity of the starting nickel salt which is used.

By the hydrogen reduction of nickel chloride, it is difficult to obtain chlorine-free nickel, and the reduction of nickel oxide obtained by thermal dissociation of nickel sulphate, carbonate, or hydroxide, always leads to powders which contain sulphur in the first case and an alkali metal in the second and third cases.

Finally, the displacement method requires finely comminuted metals like aluminium, iron, or zinc, which is very expensive, and this method leads to very low yields due to various secondary reactions of these metals with water.

An object of the present invention is, consequently, to provide a method for producing high-purity nickel powder, which substantially avoids the drawbacks of the above-mentioned known methods.

Another object of the invention is to provide a method of this kind which allows the physical parameters of the produced powder to be controlled, particularly as regards the grain size grading in such a manner that it be possible to produce powders with predetermined characteristics after a very small number of simple tests.

According to the present invention there is provided a method for producing high-purity nickel powder with predetermined physical characteristics, wherein gaseous ammonia or an aqueous solution of ammonia is reacted at a temperature between 20 and 40° C. with an aqueous solution of nickel chloride containing at least 50 g./l. of nickel, the resulting precipitate of hexammine complex of nickel chloride is separated by filtration and submitted to drying at a temperature higher than 100° C. in order to convert it, at least partly, into a diammine complex of nickel chloride with release of ammonia, and said diammine complex is reduced by hydrogen at a temperature between 450 and 1,000° C.

Suitably, said precipitate is submitted to centrifugal drying prior to being dried at said temperature higher than 100° C.

Thus, in accordance with the invention, starting directly from an aqueous solution of nickel chloride containing at least 50 g./l. of nickel, a hexammine complex of nickel chloride is precipitated at a temperature between 20 and 40° C. by bubbling gaseous ammonia into the solution or by adding to the solution an aqueous solution of ammonia, the obtained hexammine complex is dried in order to convert it, at least partly, into a diammine complex of nickel chloride with a release of gaseous ammonia, and this diammine complex is reduced by means of hydrogen.

The precipitation of the hexammine complex is nearly quantitative, with yields higher than 90%, and it is to be noted that an advantage of the method according to the invention is that it can be carried out with very simple equipment. Furthermore, the only reagents employed are ammonia and hydrogen which can be produced with high purity, so that the risks of contamination are minimised.

The ammonia released during the drying of the hexammine complex is preferably recycled for producing fresh amounts of this hexammine complex. The diammine complex of nickel chloride obtained during the drying step is then reduced, as mentioned hereinabove, which produces, on the one hand, ammonium chloride which sublimates and, on the other hand, very pure nickel powder. The ammonium chloride is itself pure, and can be sold as produced or used for generating ammonia by means of a double-decomposition reaction with lime.

Furthermore, the production of nickel powder according to the invention makes it possible, starting from a nickel chloride solution, to obtain powders with controlled physical characteristics by controlling the precipitation of the hexammine complex of nickel chloride and the temperature at which the final reduction treatment is carried out.

It is noteworthy that the method according to the invention can lead directly to the production of billets, pills, briquettes, laminates, and any other form of nickel half-product, provided that the initial ammine complexes are preformed.

Embodiments of the present invention will now be described, by way of example, with reference to the accompanying schematic drawing and to the following Examples.

In the drawing which shows a flow-sheet of the method of producing nickel powder, according to the invention, gaseous ammonia, or a commercial solution of ammonia, is first reacted at 1 with an initial solution $S_i$ of nickel chloride containing more than 50 g./l. of nickel. The amount of ammonia introduced into the solution is preferably at least two times the stoichiometric amount according to the following reaction:

$$NiCl_2 + 6NH_3 \rightarrow Ni(NH_3)_6Cl_2$$

If gaseous ammonia is used, it is bubbled into the solution at such a rate that the necessary amount is totally introduced after 2 to 5 hours. If an ammoniacal solution is used, the necessary amount is added to the nickel solution with continuous stirring during a total addition time of between 15 and 45 minutes. In both cases, the temperature of the reaction mixture is kept between 25 and 40° C. by cooling, since the reaction is strongly exothermic. A hexammine complex precipitate is thus obtained, filtered at 2, and dried in a centrifugal dryer. The mother-lye is recovered at 3.

The hexammine complex is dried at 4 at a temperature between 100 and 120° C., with release of ammonia which is recycled to stage 1. A diammine complex of nickel chloride is thus obtained, and then reduced at 5 in a tube furnace operating in fixed bed conditions. It is also possible to decompose the chloride in an alternative type of furnace with a fixed bed or a fluidized bed. Although it seems to be less advantageous, it is also possible to reduce directly at 5 the raw and wet hexammine complex obtained at 1.

The reduction 5, which leads to nickel powder, takes place within 30 to 60 minutes in an atmosphere of hydrogen at a flow-rate of about 70 litres hydrogen per hour, and at a temperature between 450 and 1,000° C.

During this reduction treatment, gaseous ammonium chloride is released and condensed at 6. This product can be stocked at 8 for sale, or dissolved again at 7 in the mother-lye 3 and treated by milk of lime for producing ammonia which is recycled to step 1. Excess hydrogen can be recycled to the reduction step 5.

The nickel powder 9 produced during the reduction step 5 can be used as such or formed and sintered.

The Examples will now be described.

EXAMPLE 1

Precipitation of hexamine nickel chloride by ammonia 1,000 ml. of an aqueous nickel chloride solution with the following composition:

|  | g./l. |
| --- | --- |
| Ni | 207 |
| Ca | 0.47 |
| Na | 0.27 |
| $SO_4^{--}$ | 0.50 | are poured into a double-walled reactor with a capacity of 3 litres, and cold water is circulated through the wall.

2,800 ml. of a 28%-ammoniacal solution are added to this nickel chloride solution over a period of 45 minutes. The addition takes place with stirring and keeping the temperature lower than 30° C. The obtained product is filtered, by means of a Büchner-filter, in order to eliminate as much water as possible.

The obtained product is then dried under vacuum at room temperature in the presence of phosphoric anhydride, for 24 hours.

740 g. of a product with the formula $Ni(NH_3)_6Cl_2$ are obtained, which corresponds to a precipitation yield of 90% with respect to the initial amount of nickel.

The precipitated complex presents the following composition:

|  | Percent | |
| --- | --- | --- |
|  | Experimental | Theoretical |
| Ni | 25.24 | 25.3 |
| $NH_3$ | 43.37 | 44.0 |
| Cl | 31.50 | 30.6 |

EXAMPLE 2

Precipitation by ammonia of the hexammine complex of nickel chloride 1,000 ml. of a nickel chloride solution with the same composition as in Example 1 are introduced in a 3 litre-reactor provided with a double wall which is water-cooled. A flow of gaseous ammonia, obtained by heating 2,800 ml. of a commercial solution of ammonia at 28%, is bubbled into this solution over a period of 4 hours. The temperature is kept near 25° C. and the solution is stirred during the reaction. The obtained product is filtrated and dried. 905 g. of raw crystals are recovered and dried under vacuum as in Example 1. The dry product corresponds to the formula $Ni(NH_3)_6Cl_2$ and weighs 801 g., which corresponds to a yield of 98% with respect to the initial amount of nickel.

EXAMPLE 3

Preparation of nickel powders

The raw hexammine complex is dried at 120° C. until it is completely converted into a diammine complex $Ni(NH_3)_2Cl_2$.

Then, for each following test, 60 g. of this diammine complex are introduced into a tube furnace through which hydrogen flows at the rate of 70 litres per hour.

A first set of tests is carried out at reduction temperatures of 450, 550 and 750° C. during one hour for the first temperature and half-an-hour for the higher temperatures.

After reduction, the nickel powders are allowed to cool to room temperature in an atmosphere of hydrogen and are then subjected to analysis.

The composition of the impurities is given in Table I below.

TABLE I.—CHEMICAL ANALYSIS

| Test No. | Reduction | | Elements (percent) | | | | | |
| --- | --- | --- | --- | --- | --- | --- | --- | --- |
|  | Temp. (° C.) | Duration (min.) | PR | C | S | Cl | Na | Ca |
| 1 | 450 | 60 | 0.60 | 0.020 | 0.004 | ND | ND | ND |
| 2 | 550 | 30 | 0.21 | 0.016 | 0.003 | 0.007 | 0.015 | 0.010 |
| 3 | 750 | 30 | 0.18 | 0.030 | 0.004 | <0.004 | 0.015 | 0.010 |
| 4 | 750 | 30 | 0.18 | 0.019 | 0.003 | <0.004 | 0.015 | 0.0082 |

NOTE.—PR=Loss on heating; ND=Not determined.

On the other hand, the physical parameters of these nickel powders are given in Table II below.

TABLE II.—PHYSICAL PARAMETERS

| Test No. | DM ($\mu$) | Porosity (percent) | D. app. N.T. |
|---|---|---|---|
| 1 | 2.5 | 75.5 | 0.70 |
| 2 | 5.2 | 70 | 0.90 |
| 3 | 6.2 | 76 | 1.02 |
| 4 | 6 | 74 | 1.06 |

NOTE.—DM=Average diameter measured by means of the Fisher "Sub Sieve Sizer" apparatus.

The porosity is also measured by means of the Fisher apparatus.

app. D.N.T.=Apparent density of the unrammed powder.

The figures in Table I show that the purity of the nickel powders produced by the method according to the invention is quite remarkable. On the other hand, Table II shows that the average diameter of the powder grains increases with the reduction temperature, which provides a first means for controlling their physical characteristics, as will be explained in greater detail below.

A second set of tests is then carried out, also producing a hexammine complex of nickel chloride by bubbling ammonia into a nickel chloride solution at 30° C., by varying the duration of the reaction. For each test, 400 ml. of a nickel chloride solution are used and the same total quantity of gaseous ammonia is bubbled into it, equal to two times the stoichiometric amount, but the flow-rate of the gas is different for each test. It will readily be understood that the duration of the bubbling is different in each case and it is easy to calculate this duration.

The other steps of the treatment are as follows: transformation of the hexammine complex into a diammine complex by drying it at 120° C., and hydrogen reduction at 550° C. over a period of 45 minutes.

Table III below shows the physical parameters of the nickel powders obtained:

TABLE III.—PHYSICAL PARAMETERS

| Test No. | Flow-rate NH$_3$ (l./min.) | DM ($\mu$) | Porosity (percent) | D. app. N.T. |
|---|---|---|---|---|
| 5 | 4 | 2.9 | 77.5 | 0.48 |
| 6 | 6 | 2.1 | 80 | 0.44 |
| 7 | 8 | 1.5 | 80 | 0.38 |
| 9 | 12 | 1 | 80 | 0.29 |

NOTE.—The meaning of the abbreviations is the same as in Table II above.

It will be apparent that the average diameter of the powder grains decreases when the flow-rate of ammonia increases, which provides a second means for controlling the physical parameters of the nickel powder produced according to the invention.

More precisely, and in order to complete what has been mentioned about Table II above, if a nickel powder with, for instance, a predetermined average grain diameter is to be produced, a limited number of tests will produce the required result. If a first test shows, for instance, that the average grain diameter is too high, the required result will be obtained by lowering the reduction temperature and/or increasing the flow-rate of ammonia which precipitates the hexammine complex, in proportion to the figures of Tables II and III above.

What we claim is:

1. A method for the production of high purity nickel powder having predetermined physical properties comprising reacting ammonia at a temperature between about 20 and 40° C. with nickel chloride in an aqueous solution containing at least 50 g./l. of nickel, separating the resulting precipitate of hexammine complex of nickel chloride, drying said precipitate at a temperature above 100° C. in order to at least partially convert it into a diammine complex of nickel chloride and to release ammonia, and reducing said diammine complex with hydrogen at a temperature between about 450 and 1,000° C.

2. The method of claim 1 in which said ammonia is introduced into said aqueous solution of nickel chloride in the gaseous state.

3. The method of claim 1 in which said ammonia is introduced into said aqueous solution of nickel chloride in the form of an aqueous solution.

4. The method of claim 1 in which said precipitate of hexammine complex of nickel chloride is separated by filtration.

5. The method of claim 1 in which said precipitate is dried centrifugally.

6. The method of claim 1 in which the physical properties of said nickel powder are varied by varying the temperature at which said diammine complex is reduced by hydrogen.

7. The method of claim 1 in which said physical properties of said nickel powder are varied by varying the rate of introduction of said ammonia into said aqueous solution of nickel chloride.

8. The method of claim 1 in which said ammonia is reacted with said nickel chloride in at least twice the stoichiometric amount necessary for the production of said hexammine complex.

9. The method of claim 1 in which said ammonia released during the drying of said hexammine complex is recycled and reacted with fresh amounts of nickel chloride in aqueous solution.

10. The method of claim 1 in which ammonium chloride produced during the reduction of said diammine complex by hydrogen is dissolved in the mother-lye of said filtration step, reacted with lime, and the ammonia thereby released is recycled and reacted with fresh amounts of nickel chloride in aqueous solution.

11. The method of claim 1 in which said precipitate is dried at a temperature of about 120° C.

References Cited

UNITED STATES PATENTS

| | | | |
|---|---|---|---|
| 3,235,377 | 2/1966 | Hard | 75—119 |
| 3,186,829 | 6/1965 | Landitraf | 75—82 |
| 3,399,050 | 8/1968 | Evans | 75—103 X |
| 3,544,309 | 12/1970 | Fletcher | 75—119 X |
| 3,658,508 | 4/1972 | Weir | 75—82 |
| 3,458,407 | 7/1969 | Wrangell | 75—82 |
| 3,640,706 | 2/1972 | Zubrycky | 75—119 |

L. DEWAYNE RUTLEDGE, Primary Examiner

P. D. ROSENBERG, Assistant Examiner

U.S. Cl. X.R.

75—119